(12) United States Patent
Stubbs et al.

(10) Patent No.: US 10,207,868 B1
(45) Date of Patent: Feb. 19, 2019

(54) VARIABLE COMPLIANCE EOAT FOR OPTIMIZATION OF GCU

(71) Applicant: Amazon Technologies, Inc., Seattle, WA (US)

(72) Inventors: Andrew Stubbs, Waltham, MA (US); Ennio Claretti, Somerville, MA (US); Andrew D. Marchese, Concord, MA (US); Samuel Rubin Barrett, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 15/371,077

(22) Filed: Dec. 6, 2016

(51) Int. Cl.
*B65G 1/137* (2006.01)
*G06Q 10/08* (2012.01)

(52) U.S. Cl.
CPC .......... *B65G 1/137* (2013.01); *G06Q 10/087* (2013.01)

(58) Field of Classification Search
USPC ...................................................... 700/218
See application file for complete search history.

(56) References Cited

U.S. PATENT DOCUMENTS

| | | | |
|---|---|---|---|
| 3,804,270 A * | 4/1974 | Michaud | B25J 19/023 209/564 |
| 8,280,547 B2 | 10/2012 | D'Andrea et al. | |
| 9,087,314 B2 | 7/2015 | Hoffman et al. | |
| 9,457,477 B1 * | 10/2016 | Rublee | B25J 15/0023 |
| 9,492,923 B2 | 11/2016 | Wellman et al. | |
| 2015/0032252 A1 * | 1/2015 | Galluzzo | B25J 5/007 700/218 |
| 2016/0167227 A1 | 6/2016 | Wellman et al. | |
| 2017/0039514 A1 * | 2/2017 | Jones | G06Q 10/087 |

OTHER PUBLICATIONS

U.S. Appl. No. 15/371,022, filed Dec. 6, 2016, Titled: Learning Force Limits of Items for Use in GCU Optimization.

* cited by examiner

*Primary Examiner* — Kyle O Logan

(74) *Attorney, Agent, or Firm* — Kilpatrick Townsend & Stockton LLP

(57) ABSTRACT

Described herein is an inventory management system and methods of operating a robotic arm assembly in which the level of compliance of the robotic arm assembly is altered in order to achieve a high gross cubic utilization. In at least some embodiments, a robotic arm assembly may adopt a low level of compliance when grasping an item. The inventory management system may identify an appropriate storage location for the item and move the item to that storage location. Upon reaching the storage location, the robotic arm assembly may adopt a higher level of compliance. The robotic arm assembly may then push the item against one or more other items in order to insert the item into the determined storage location.

20 Claims, 9 Drawing Sheets

US 10,207,868 B1

VARIABLE COMPLIANCE EOAT FOR OPTIMIZATION OF GCU

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

Additionally, in high-capacity inventory systems (e.g., inventory systems that manage thousands of items per day), there is a need to optimize the storage of inventory items in order to better utilize the storage space available. To better utilize available storage space, the operator of a high-capacity inventory system may need to optimize gross cubic utilization (GCU) (e.g., the amount of space actually occupied by items while in storage). In inventory systems that utilize robotic system components for item storage and retrieval, items maintained in the inventory system are often stored in a way that does not optimize GCU (e.g., there is significant space between the items) since it is difficult for robotic system components to stow items in tight spaces.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to robotic arms or manipulators and associated components that may facilitate the movement of inventory items and other features of the inventory system among and between elements of the inventory system. The robotic arms or manipulators may be controlled so as to grasp, move, and release items in manners particularly suited for retrieving and/or storing items. In some embodiments, the robotic arms or manipulators may comprise one or more mechanisms configured to alter a level of compliance of the robotic arm assembly. The term "compliance," for the purposes of this disclosure, refers to flexibility, or lack of impedance in a robotic manipulator. For example, a non-compliant (stiff) robotic manipulator is a device which is designed to have predetermined positions or trajectories with little flexibility.

In accordance with at least some embodiments, the disclosure is directed to a robotic arm assembly configured to vary its level of compliance. In some embodiments, the robotic arm assembly may include one or more compliance variation mechanisms capable of varying mechanical impedance within the robotic arm assembly. For example, the mechanical impedance may be increased (lowering the level of compliance) of the robotic arm in order to increase its precision while grasping an item. In another example, the mechanical impedance of a manipulator on the robotic arm may be decreased (raising the level of compliance) in order to increase the flexibility of the manipulator and enable placement of the item amongst other items in an inventory holder. The increased flexibility allows the robotic arm to push an item against other items in the inventory holder in order to place the item in as close proximity as possible to other items. This enables the inventory management system to optimize a gross cubic utilization (GCU) of inventory space.

Figure 1:
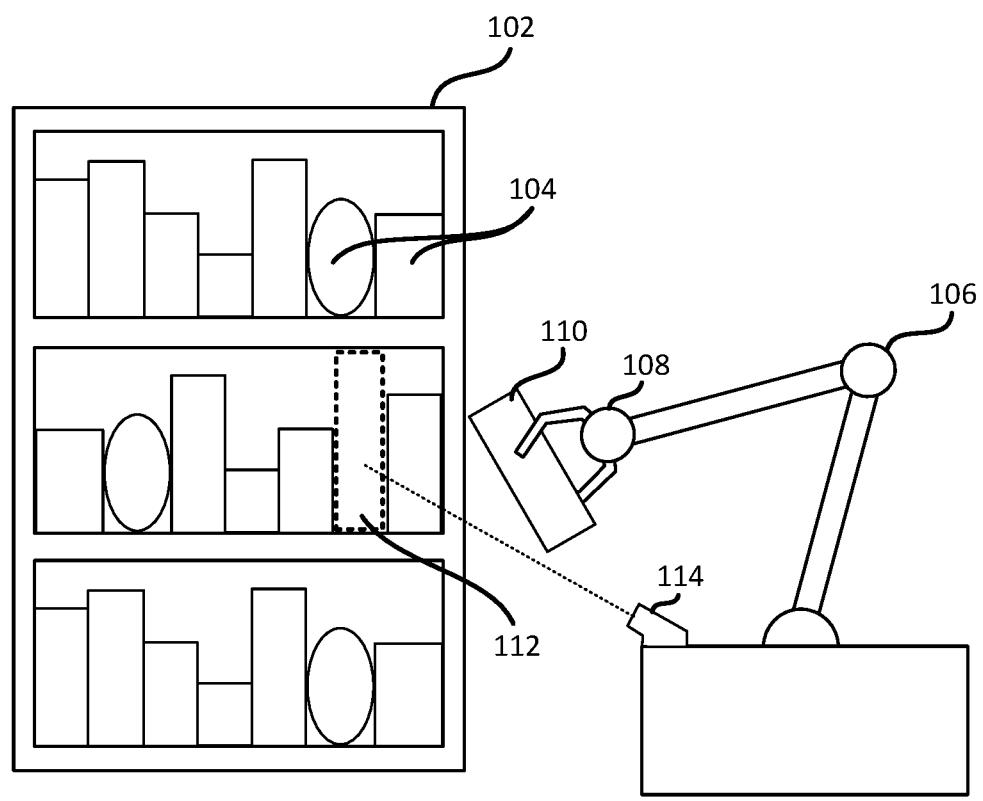
FIG. 1 illustrates aspects of an automated inventory system in accordance with at least some embodiments of the disclosure.

FIG. 1 illustrates aspects of an automated inventory system in accordance with at least some embodiments of the disclosure. In the depicted inventory management system, an inventory holder 102, or another suitable item storage unit, may contain a number of inventory items 104 managed by the inventory system. In at least some embodiments, the inventory management system may additionally include a robotic arm assembly 106. The robotic arm assembly may include an end-of-arm tool (EOAT) 108 configured to stow and/or retrieve an item 110 from a storage space 112. In some embodiments, the inventory system may include one or more input sensors 114 configured to capture information related to the inventory system. In some embodiments, the robotic arm assembly 106 may comprise one or more force sensors capable of detecting a level of force applied to the robotic arm. In some embodiments, the input obtained from a force sensor installed on the robotic arm may be used to control a level of power being applied at a joint of the robotic arm, varying a level of compliance of the robotic arm.

In some embodiments, an inventory holder 102 may comprise any suitable form of inventory holder. In some embodiments, the inventory holder 102 may be mobile, in that it may be configured to be moved (e.g., by a mobile drive unit). In some embodiments, the inventory holder 102 may comprise a bin or shelving unit.

In some embodiments, the robotic arm assembly 106 may be any device configured to stow and/or retrieve items from an inventory holder 102. In some embodiments, the robotic arm assembly 106 may include an EOAT configured to grasp and/or otherwise manipulate items. The robotic arm assembly 106 may operate in accordance with instructions provided by the inventory management system to stow an item in, or retrieve the item from, a particular placement location. A placement location may comprise any location in which an item may be stowed, including a storage location within an inventory holder, a storage bin, or a shipping container.

The EOAT 108 may utilize any suitable end effector (or combination of end effectors) to engage the item 110 to facilitate stowing or retrieving the item 110. Examples of suitable end effectors may include, but are not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may grasp items using suction. Electro-adhesion end effectors can include an array of electrodes arranged along a flexible or rigid substrate capable of applying a charge (akin to static electricity) that can adhere an item to the substrate portions that are in contact with the item. Mechanical or electromechanical end effectors may include pinchers, claws, grippers, or other rigid components that may be actuated relative to one another for grasping an item. Other end effectors may also be utilized to facilitate additional grasping and/or stowing techniques. For example, a magnetic or electromagnetic end effector may be useful for grasping items having ferro-magnetic materials. As another example, an end effector may include a platform or other structure that can be placed underneath an item (e.g., by scooping the item or as a result of the item dropping onto the platform) so as to grasp the item by supporting the item from underneath.

An input sensor 114 may comprise one or more sensors (of like or varying type) arranged to detect the item 110 while the item 110 is being maintained by the inventory system. Input obtained by an input sensor 114 may take a variety of forms of data input types, including, but not limited to, audio data, visual data, and/or biometric data. In some embodiments, the obtained input may be processed by one or more system components. For example, image input data may be processed using one or more image processing techniques in order to identify aspects of the inventory system. In particular, image information obtained by an input sensor 114 may be used to identify one or more items 104 and/or an open storage space 112. In some embodiments, the image information may be processed to determine dimension specifications for an item or storage space (e.g., width, height, depth, etc.). The input sensor 114 communicates detected attributes, such as a weight, geometric characteristics (e.g., size, position or orientation), electrical conductivity, magnetic properties, surface characteristics (e.g., how slippery or porous the item is), deformability, and/or structural integrity of the item 110, to a controller of the robotic arm assembly 106. The detected attributes may also include a unique identifier of the item 110, such as a barcode- or RFID-encoded serial number. Based on the detected attributes, the controller may access an item database, such as to access a record for the inventory item 110. The record can include information about attributes of the item, such as weight, shape, size, or other physical characteristics of the item. Based on the record from the item database and/or the detected attributes from the input sensor 114, the controller may access determine an appropriate pose and/or storage strategy for the item 110 or items with similar characteristics. In some embodiments, the controller for the robotic arm assembly 106 may select an appropriate grasping strategy based on a pose that the item is to be stowed in. In some embodiments, the input sensor 114 may include one or more sensors configured to detect an amount of force applied to the robotic arm. In these embodiments, input provided by the one or more force detection sensors may be used to control a level of compliance in the robotic arm and/or an amount of force applied by the robotic arm.

The robotic arm assembly 106 may comprise a number of compliance variation mechanisms for varying a compliance of the robotic arm assembly 106. For example, the robotic arm assembly may comprise one or more compliance variation actuators. In some embodiments, a force feedback may be used to control the power being applied at a joint, effecting the mechanical impedance of the joint. In some embodiments, the robotic arm assembly 106 may comprise one or more series elastic actuators, in which a spring and/or controlled deflection mechanism is placed between a motor and the joint it actuates in order to effect the mechanical impedance. n some embodiments, the robotic arm assembly 106 may comprise one or more variable compliance actuator, in which a spring constant of the actuator may be altered in real time. In some embodiments, the robotic arm assembly 106 may comprise one or more variable compliance joints, in which the stiffness of an under-actuated element may be changed to effect mechanical impedance. In some embodiments, the robotic arm assembly 106 may comprise one or more soft robotics, in which bladders can be filled/drained to change the compliance of an elastomer based joint. Compliance variation mechanisms may be located at a number of points on the robotic arm, allowing a level of compliance to be manipulated throughout the robotic arm.

In some aspects, a control unit may provide instructions to the robotic arm assembly 106 for gripping the item 110 based on a grasping strategy accessed from the item grasping database and, based on the selected grasping strategy, access a storage strategy for the item 110. In other aspects, the controller may access a particular grasping strategy from the item grasping database based on the storage strategy accessed from an item storage database. An item database, an item grasping database, and an item storage database (or any combination thereof) may share structure and/or content. In some embodiments, each of these databases may be stored on an entity external to the robotic arm assembly. For example, the databases may each be stored on a server in communication with the robotic arm assembly 106. Furthermore, development and use of an item grasping database and associated elements that may be utilized for the item grasping database and associated elements is described in U.S. patent application Ser. No. 14/572,420, filed Dec. 16, 2014, entitled "GENERATING ROBOTIC GRASPING INSTRUCTIONS FOR INVENTORY ITEMS" and U.S. patent application Ser. No. 14/572,332, filed Dec. 16, 2014, entitled "ROBOTIC GRASPING OF ITEMS IN INVENTORY SYSTEM", the entire disclosures of which are incorporated herein by reference.

In operation, the robotic arm assembly 106 may retrieve and stow an inventory item 110, such as by performing a series of operations that include grasping the item 110, identifying an open storage space 112, determining that the identified storage space 112 is of an appropriate size for the item 110 (e.g., using the input sensor 114), moving the grasped item 110 close to the identified storage space 112, varying a degree of compliance for the EOAT 108, and pushing the item into the open storage space 112. In various embodiments, varying the compliance of the EOAT 108, the system may maximize the speed and accuracy at which the items can be manipulated, while adding the ability to push items next to each other, yet minimize the risk of damage.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
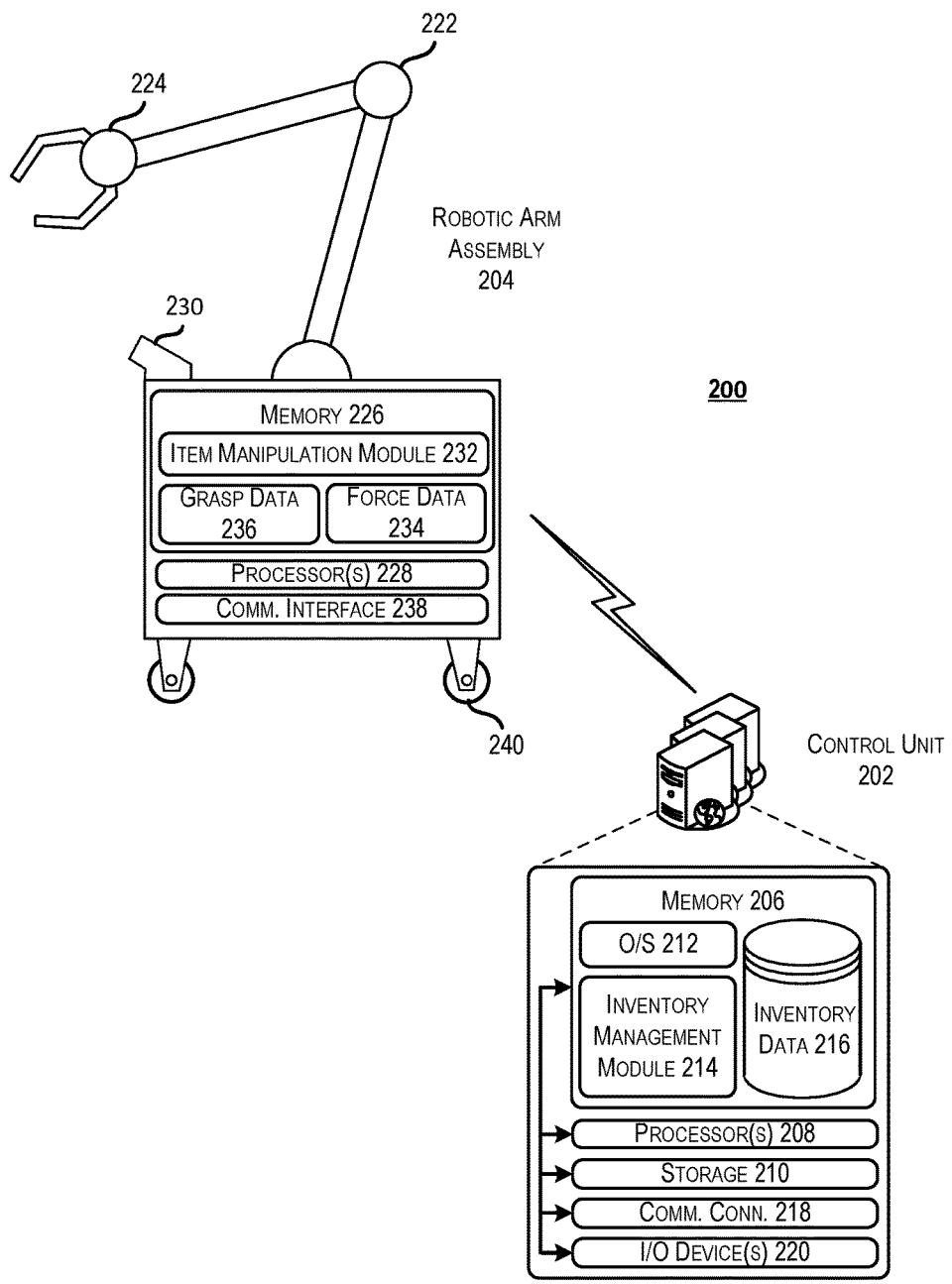
FIG. 2 illustrates an example inventory system architecture that may be implemented in accordance with embodiments of the disclosure.

FIG. 2 illustrates an example inventory system architecture that may be implemented in accordance with embodiments of the disclosure. In architecture 200, a control unit 202 may be in communication with inventory management components, such as a robotic arm assembly 204.

The control unit 202 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the control unit 202 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the control unit 202 may include at least one memory 206 and one or more processing units (or processor(s)) 208. The processor(s) 208 may be implemented as appropriate in hardware, computer-executable instructions, firmware or combinations thereof. Computer-executable instruction or firmware implementations of the processor(s) 208 may include computer-executable or machine executable instructions written in any suitable programming language to perform the various functions described.

The memory 206 may store program instructions that are loadable and executable on the processor(s) 208, as well as data generated during the execution of these programs. Depending on the configuration and type of control unit 202, the memory 206 may be volatile (such as random access memory (RAM)) and/or non-volatile (such as read-only memory (ROM), flash memory, etc.). The control unit 202 may also include additional storage 210, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 206 may include multiple different types of memory, such as static random access memory (SRAM), dynamic random access memory (DRAM) or ROM. Turning to the contents of the memory 206 in more detail, the memory 206 may include an operating system 212 and one or more application programs or services for implementing the features disclosed herein including at least a module for managing stowage and retrieval of items in the inventory system (inventory management module 214). The memory 206 may also include inventory data 216, which provides information associated with items managed by the inventory system. In some embodiments, the inventory data 216 may be stored in a database.

The memory 206 and the additional storage 210, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the control unit 202. The control unit 202 may also contain communications connection(s) 218 that allow the control unit 202 to communicate with a stored database, another computing device or server, user terminals, and/or other components of the inventory system. The control unit 202 may also include input/output (I/O) device(s) and/or ports 220, such as for enabling connection with a keyboard, a mouse, a pen, a voice input device, a touch input device, a display, speakers, a printer, etc.

Turning to the contents of the memory 206 in more detail, the memory 206 may include an operating system 212, a database containing inventory data 216 and the one or more application programs or services for implementing the features disclosed herein, including an inventory management module 214.

In some embodiments, the inventory management module 214 may be configured to, in conjunction with the processors 208, manage stowage and retrieval of items. In some embodiments, the inventory management module 214 may be configured to identify items to be retrieved from storage locations (e.g., in order to be shipped in a fulfillment order), identify storage locations in which to stow items, determine routing information to be used by components of the inventory system, and to perform any other suitable inventory management tasks. In some embodiments, the inventory management module 214 may be configured to Inventory data 216 may be predetermined or it may be dynamically generated. For example, force limit and/or compressibility data associated with an item may be updated as new information is received on that item. In some embodiments, the inventory data 216 may include information related to grasping of items. In some embodiments, the inventory data 216 may include information related to a pose that is appropriate for one or more items. Force limit information may be stored in relation to particular item poses.

The robotic arm assembly 204 may comprise any robotic device configured to move items from one location to another. The robotic arm assembly 204 may comprise a mechanical arm 222 with an EOAT 224. In some embodiments, the EOAT 224 may be detachable. For example, the EOAT may be configured to be attached and unattached to the mechanical arm 222. In some embodiments, an EOAT may be selected that is appropriate for manipulating a particular item. The robotic arm assembly 204 may comprise a number of mechanisms for varying a compliance of the robotic arm assembly 204. For example, the robotic arm assembly 204 may comprise one or more compliance variation mechanisms. In some embodiments, a force feedback may be used to control the power being applied at a joint, effecting the mechanical impedance of the joint. In some embodiments, the robotic arm assembly 204 may comprise one or more series elastic actuators, in which a spring and/or controlled deflection mechanism is placed between a motor and the joint it actuates in order to effect the mechanical impedance. n some embodiments, the robotic arm assembly 204 may comprise one or more variable compliance actuator, in which a spring constant of the actuator may be altered in real time. In some embodiments, the robotic arm assembly 204 may comprise one or more variable compliance joints, in which the stiffness of an under-actuated element may be changed to effect mechanical impedance. In some embodiments, the robotic arm assembly 204 may comprise one or more soft robotics, in which bladders can be filled/drained to change the compliance of an elastomer based joint.

In one illustrative configuration, the robotic arm assembly 204 may include at least one memory 226 and one or more processing units (or processor(s)) 228. The processor(s) 228 may be implemented as appropriate in hardware, computer-executable instructions, firmware or combinations thereof. Computer-executable instruction or firmware implementations of the processor(s) 228 may include computer-executable or machine executable instructions written in any suitable programming language to perform the various functions described. Additionally, the robotic arm assembly 204 may comprise a number of input sensors 230, which detect and provide input related to conditions of an environment that the robotic arm assembly 204 is located within.

The memory 226 may store program instructions that are loadable and executable on the processor(s) 228, as well as data generated during the execution of these programs. The memory 226 may include one or more application programs or services for implementing the features disclosed herein including at least a module for determining how to manipulate an item (item manipulation module 232). The memory 226 may also include item force data 234, which provides information associated with forces that may be applied to items managed by the inventory system. The memory 226 may also include item grasp data 236, which provides information associated with grasping requirements/strategies for items managed by the inventory system.

In accordance with at least some embodiments, the item manipulation module 232 may be configured to, in conjunction with the processors 228, determine an appropriate strategy to be used in manipulating an item. For example, the item manipulation module 232 may be configured to determine an appropriate grasp to be used on an item from grasp data 236. In another example, the item manipulation module 232 may be configured to determine an appropriate level of force to be applied to an item from the force data 234. The item manipulation module 232 may be configured to cause an EOAT 224 to apply the determined level of force to the item in order to stow the item.

The robotic arm assembly 204 may include a communication interface 238 that allow the robotic arm assembly 204 to communicate with the control unit 202, another computing device or server, user terminals, and/or other components of the inventory system. In some embodiments, the communication interface 238 may comprise a wireless communication mechanism. In some embodiments, the communication interface 238 may comprise a physical wired connection with other components of the system.

In some embodiments, the robotic arm assembly 204 may be stationary (e.g., incapable of movement). In some embodiments, the robotic arm assembly 204 maybe mobile, in that the robotic arm assembly 204 is configured to traverse from a first location to a second location. For example, the robotic arm assembly 204 may be configured to pick up an item at a first location, receive instructions to place the item at a second location, traverse to the second location, and place the item at the second location. In these embodiments, the robotic arm assembly 204 may comprise any suitable mobility means 240. For example, the robotic arm assembly 204 may include wheels and a motorized engine, such that the robotic arm assembly 204 is capable of autonomous movement. In this example, the memory 226 may include a set of computer-executable instructions to configured to perform route guidance. In another example, the robotic arm assembly 204 may be located on a track or conveyor belt.

Figure 3:
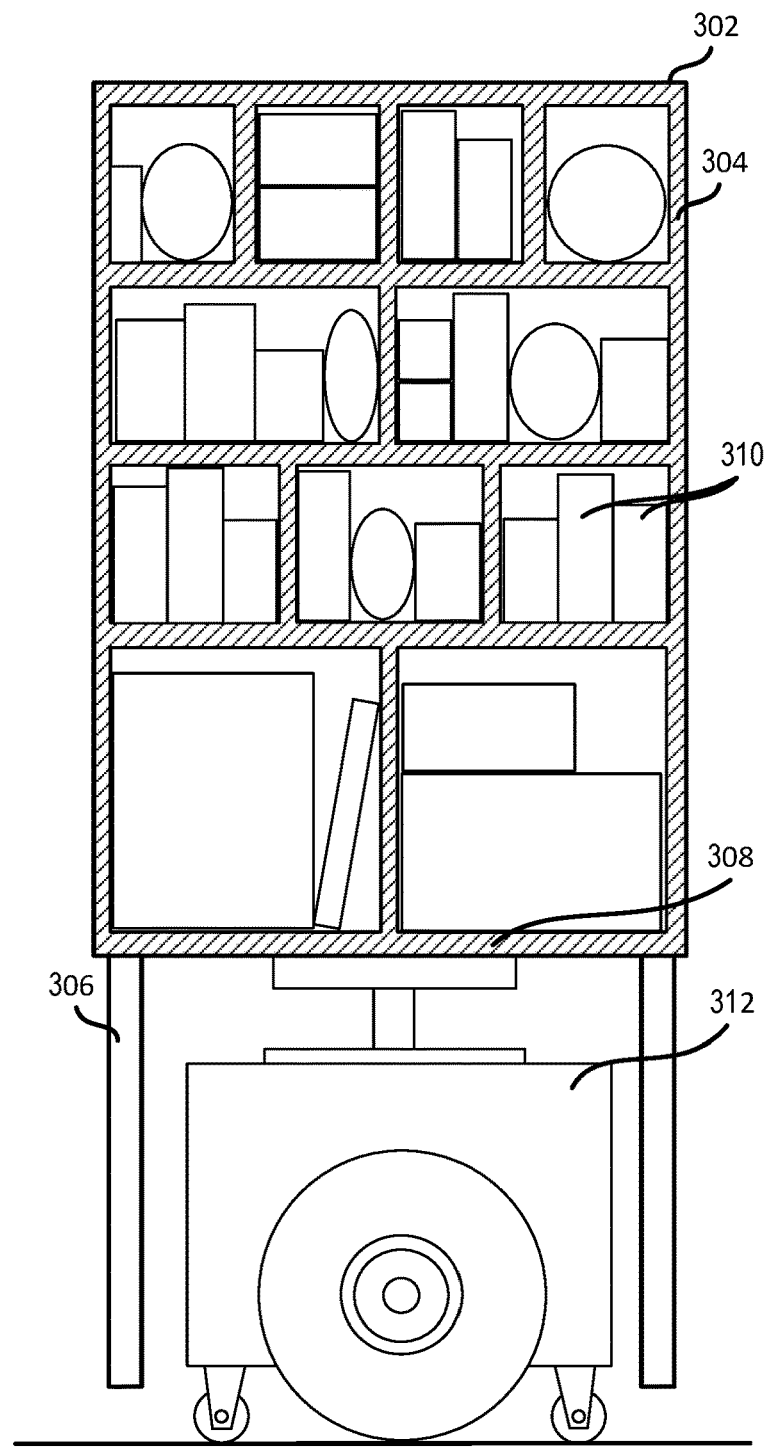
FIG. 3 illustrates in greater detail the components of a particular embodiment of an inventory holder.

FIG. 3 illustrates in greater detail the components of a particular embodiment of an inventory holder. In particular, FIG. 3 illustrates the structure and contents of one side of an example inventory holder 302. In a particular embodiment, inventory holder 302 may comprise any number of faces with similar or different structure. As illustrated, inventory holder 302 may include a frame 304, a plurality of legs 306, and a docking surface 308. In some embodiments the inventory holder 302 may be configured to be moved and/or rotated by a mobile drive unit 312.

Frame 304 may hold a number of inventory items 310. Frame 304 may provide storage space for storing inventory items 310 external or internal to frame 304. The storage space provided by frame 304 may be divided into a plurality of storage locations, each capable of holding inventory items 310. The storage locations may include any appropriate storage elements, such as bins, compartments, or hooks. In some embodiments, the frame 304 may be comprised of elastic or otherwise compressible material. In these embodiments, an inventory system may account for the elasticity of the frame 304 when determining an appropriate amount of force to be applied to an item.

Additionally, each inventory holder 302 may include a plurality of faces, and each storage location may be accessible through one or more faces of the inventory holder 302. For example, in a particular embodiment, inventory holder 302 may include four faces. In such an embodiment, storage locations located at a corner of two faces may be accessible through either of those two faces, while each of the other storage locations may be accessible through an opening in one of the four faces. In some embodiments, an inventory holder 302 may be rotated (e.g., via a mobile drive unit 312) at appropriate times to present a particular face and storage location associated with that face to an operator or other components of the inventory system. In accordance with at least some embodiments, the inventory holder 302 may be moved to a robotic arm in order to facilitate stowage of an item into the inventory holder 302 by that robotic arm.

Inventory items represent any objects suitable for storage, retrieval, and/or processing in an automated inventory system. For the purposes of this description, inventory items may represent any one or more objects of a particular type that are stored in inventory system. Thus, a particular inventory holder 302 may store a particular inventory item if the inventory holder 302 currently holds one or more units of that type. As one example, inventory system may represent a mail order warehouse facility, or other fulfillment center, and inventory items may represent merchandise stored in the warehouse facility. During operation, a mobile drive unit 312 may retrieve an inventory holder 302 that contains one or more inventory items requested in an order to be packed for delivery to a customer or inventory holders 302 carrying pallets containing aggregated collections of inventory items for shipment. Moreover, in particular embodiments of the inventory system, boxes containing completed orders may themselves represent inventory items.

As described above, the inventory holder 302 may be configured to be moved by a mobile drive unit 312. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 312 represent elements of a tracked inventory system configured to move an inventory holder 302 along tracks, rails, cables, crane system, or other guidance or support elements traversing workspace. In such an embodiment, a mobile drive units 312 may receive power and/or support through a connection to the guidance elements, such as a powered rail. Additionally, in particular embodiments of inventory system, a mobile drive unit 312 may be configured to utilize alternative conveyance equipment to move within a workspace and/or between separate portions of the workspace.

Figure 4:
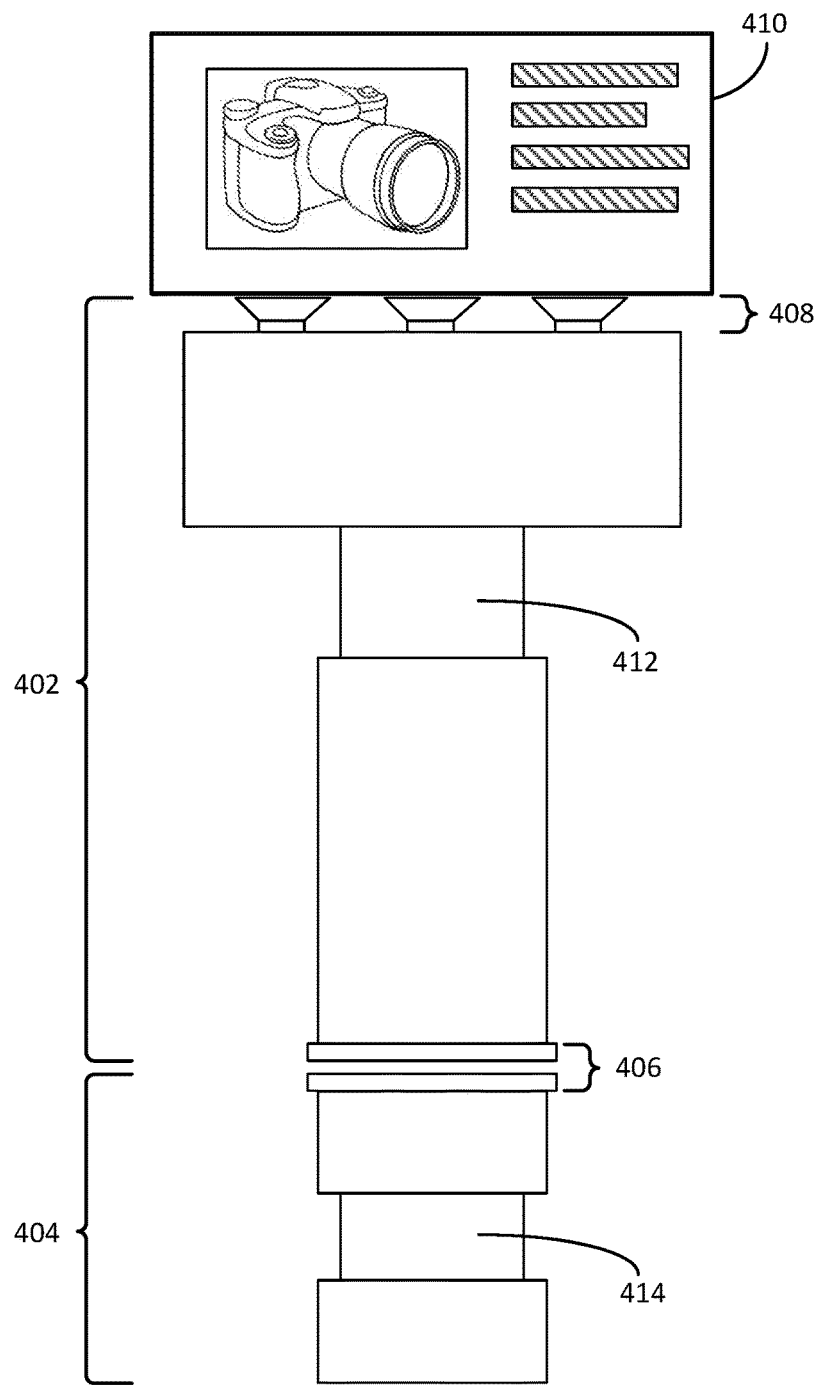
FIG. 4 depicts a manipulator that may be implemented in accordance with at least some embodiments.

FIG. 4 depicts a manipulator that may be implemented in accordance with at least some embodiments. In some embodiments, a manipulator may comprise an EOAT 402 attached to a robotic arm assembly 404 via a mounting element 406. The EOAT 402 includes an end effector 408. An end effector 408 is the device at the end of a manipulator designed to interact with the environment or an item 410 in the environment (e.g., the end effector is designed to retrieve and/or stow items). The type of end effector 408 selected for use by a controller of a robotic arm assembly may depend on the application of the robot (e.g., the type of item to be retrieved and/or stowed).

In FIG. 4, a degree of compliance of a manipulator may be varied in a number of ways. In some embodiments, a robotic arm assembly may include one or more variable impedance actuators capable of varying a degree of compliance in the manipulator. As depicted in FIG. 4, variable impedance actuators (e.g., 412 and 414) may be included at various positions of a manipulator in order to vary a degree of compliance at each of those positions. For example, in some embodiments a variable impedance actuator 412 may be located on the EOAT 402. This enables a degree of compliance to be adjusted for the EOAT itself. In another example, a variable impedance actuator 414 may be located in the robotic arm assembly so that a degree of compliance may be adjusted for the manipulator regardless of which EOAT is used. In some embodiments, a combination of positioned variable impedance actuators 412 and 414 may be utilized to adjust a degree of compliance at multiple locations of the manipulator.

In accordance with at least some embodiments, a degree of compliance (e.g., mechanical-impedance) may be adjusted through the use of a variable remote center compliance (VRCC) device and one or more variable impedance actuators (e.g., 412 and/or 414). By way of illustrative example, an item may be manipulated (picked up) from a source container using a gripper mechanism to grasp the item 410. A stiff connection between the item and the manipulator may be formed by setting a variable impedance actuator into high impedance mode, which allows the manipulator to move quickly without risking loss of the item 410. Once the item is near a target storage space (e.g., close enough to a target location container such that when partially released the item may fall into contact with the container or items in the container) the variable impedance actuator is transitioned to low impedance mode. This adds compliance to the connection between the item 410 and the manipulator during storage of the item. Impedance of one or more variable impedance actuators may be set based on a learned variable impedance actuator setting for the item 410 and/or target container contents. For example, the maximum force used may be set to the minimum force that the set of items could be damaged by. Continuing with the above illustrative example, the manipulator may then move the item 410 towards other items and or inventory holder walls. The added compliance allows the item to push up against surfaces, while avoiding applying a damaging force to the items involved. It also allows the surrounding items or walls to be used to guide the item into the desired position.

In accordance with at least some embodiments, a degree of compliance may be adjusted through manipulation of the end effector 408. For example, a degree of compliance may be adjusted by adjusting the strength of connection between the end effector 408 and the item 410. By way of illustrative example, an item may be manipulated (picked up) from source location using an end effector 408 having multiple suction cups. This forms a stiff connection between the item and the manipulator (robotic arm assembly and EOAT) and allows the manipulator to move quickly. In this way, the use of more than one suction cup in the end effector 408 adds stability to the connection between the item and the robotic arm assembly used to move the item. This added stability is used to accelerate and decelerate the item 410 quickly and thus reduce the transfer time between containers without the risk of losing the item 410. Once the item is near a storage space (e.g., close enough to a target location container such that when partially released the item may fall into contact with the container or items in the container) one or more of the suction cups of the end effector 408 may be released. This adds compliance to the connection between the item and the manipulator. For a three suction cup end effector 408, either one or two of the suction cups could be released and the end effector 408 would still have enough vacuum to hold the item. In this example, the manipulator may then move the item 410 towards other items and or storage walls. The added compliance allows the item 410 to be pushed up against surfaces, while preventing damaging force to the items involved.

Figure 5:
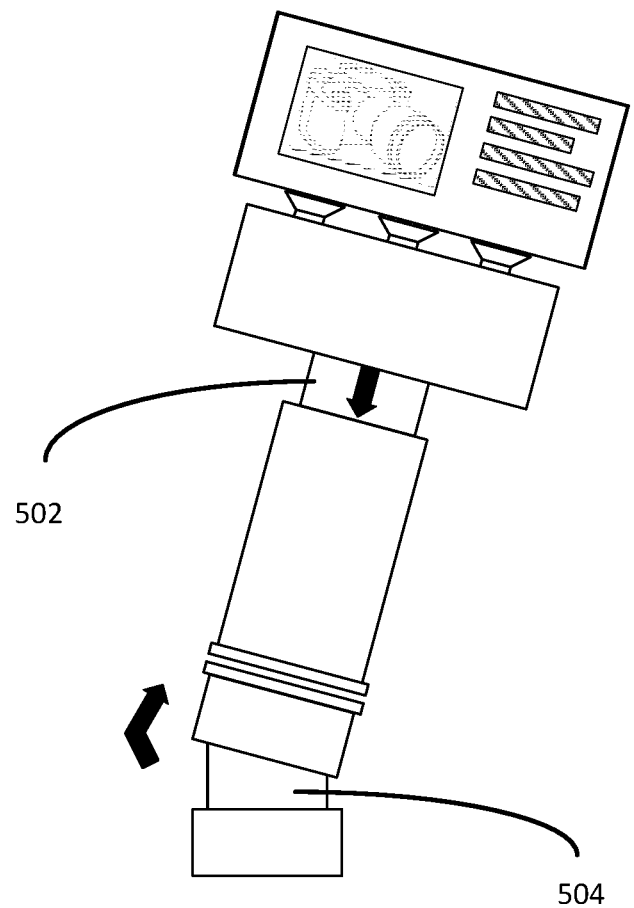
FIG. 5 depicts ranges of movement that may be exhibited by a compliant end-of-arm tool in accordance with at least some embodiments.

FIG. 5 depicts ranges of movement that may be exhibited by a compliant end-of-arm tool in accordance with at least some embodiments. FIG. 5 depicts a manipulator having multiple variable impedance actuators 502 and 504, each of which may be configured to adjust mechanical impedance of manipulator at their respective locations.

In accordance with at least some embodiments, a variable impedance actuator 502 may be configured to adjust a linear compliance of a manipulator (e.g., compliance along a single axis). For example, a variable impedance actuator may be used to adjusted linear compliance by changing the pretension or preload on a spring. This variable impedance actuator may be used to adjust the amount of force that may be absorbed along a single axis. For example, upon bumping into another object, the variable impedance actuator may "give" or retract slightly. This allows the manipulator to absorb at least a portion of any impact between a manipulated item and other items, which prevents breakage of those items while allowing items to be pushed out of the way.

In accordance with at least some embodiments, a variable impedance actuator 504 may be configured to adjust a nonlinear compliance of a manipulator (e.g., rotational compliance). For example, the variable impedance actuator 504 may be configured such that the manipulator is able to allow an item to pivot or rotate around the variable impedance actuator 504. This allows the item's course to be readjusted automatically when the item is not correctly aligned with a storage space, which further prevents breakage. It should be noted that a variable impedance actuator may include any combination of variable impedance actuator 502 and variable impedance actuator 504.

Figure 6A:
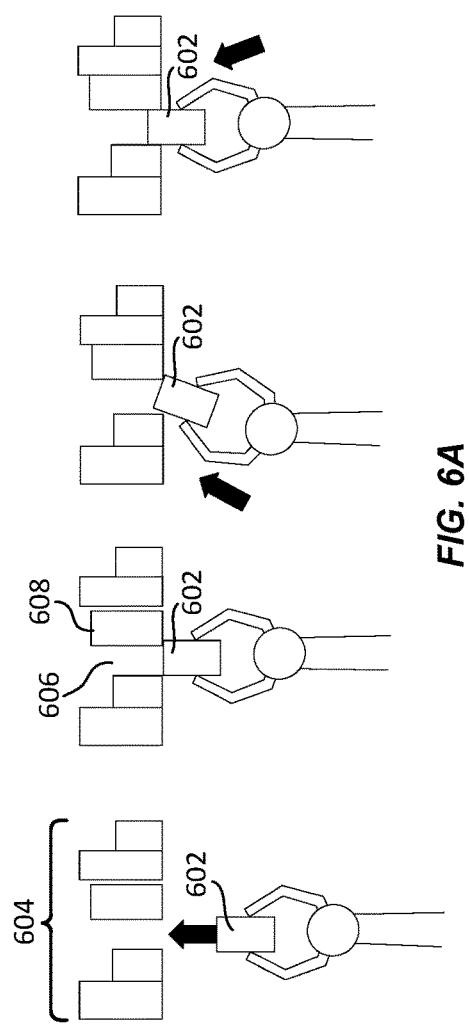
FIG. 6A depicts a first illustrative example of a method for stowing an item to optimize gross cubic utilization.

FIG. 6A depicts a first illustrative example of a method for stowing an item to optimize GCU. In FIG. 6A, a robotic manipulator is depicted as stowing an item 602 into a container device that includes a set of items 604. The inventory management system may identify that there is a storage space 606 open within the set of items 604. The storage space 606 may be assessed to determine whether it is an appropriate size for the item 602. In some embodiments, the storage space 606 may be selected based on a fragility of the item 602. For example, fragile items may be stored in specified storage locations and/or in proximity of particular types of items. The inventory management system may determine that the storage space 606 is appropriate for the item 602 based on other items located proximate to the storage space 606. For example, the inventory management system may attempt to place hard-to-identify items between items that are easier to identify. In this example, hard-to-identify items may comprise items that may contort or otherwise change shape (e.g., clothing items that may be folded), items that lack distinctive packaging (e.g., an item in an unmarked box), items without distinctive markings, or any other suitable items less likely to be identified using image processing techniques.

In accordance with at least some embodiments, one or more items 608 within the set of items 604 may have shifted, which may subsequently affect the storage space 606. Because of this shift, the size of the available storage space may have been decreased. In this scenario, the robotic arm may be configured to increase a level of compliance of the manipulator and push the item 602 against the other items in the set of items 604 in order to increase the size of the space and/or squeeze the item 602 into the storage space. The manipulator may push the item 602 in various directions in order to insert the item into the storage space. It should be noted that the increased compliance of the manipulator will allow the manipulator to comply or deflect at least some of the force from pushing the other items, preventing breakage of the item 602 or other items in the set of items 604. By varying the compliance of the robotic arm pushing the item, at least a portion of the force applied to the item is conveyed to the robotic arm, unless the item itself loses structural integrity (e.g., the item crumples or otherwise deforms). In this scenario, the level of compliance may be increased by an amount determined based on a type of item 602 being stowed (e.g., a force limit associated with the item). In some embodiments, once the item 602 has been at least partially inserted into the storage space, the manipulator may let go of the item 602 and push the item 602 the rest of the way into the storage space 606.

In some embodiments, the amount of force applied by the manipulator when placing the item into the storage space may be determined based on a force limit associated with the item. Examples of such force limits and methods of learning those force limits are disclosed in U.S. patent application Ser. No. 15/371,022, filed on Dec. 6, 2016, titled "LEARNING FORCE LIMITS OF ITEMS FOR USE IN GCU OPTIMIZATION," the entirety of which is herein incorporated by reference.

Figure 6B:
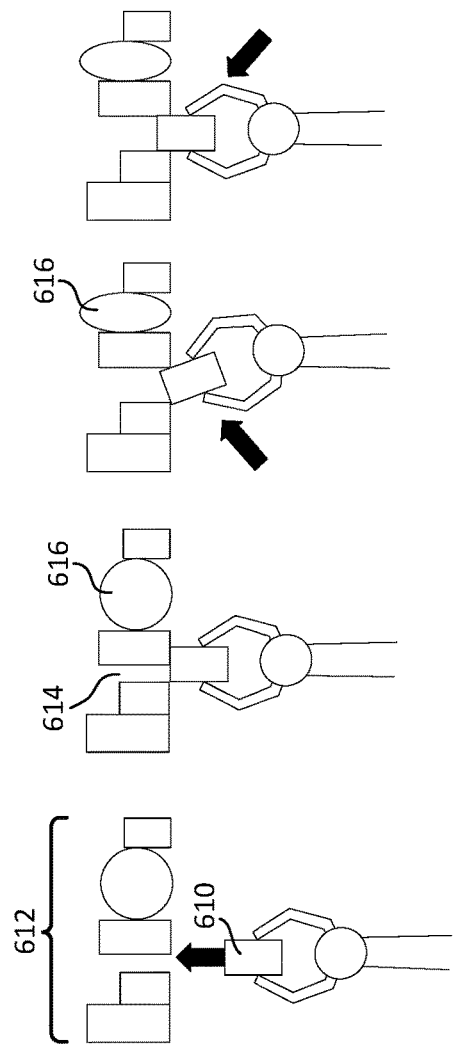
FIG. 6B depicts a second illustrative example of a method for stowing an item to optimize gross cubic utilization.

FIG. 6B depicts a second illustrative example of a method for stowing an item to optimize GCU. In FIG. 6B, a robotic manipulator is depicted as stowing an item 610 into a container device that includes a set of items 612. The inventory management system may identify that there is a storage space 614 open within the set of items 612. The storage space 614 may be assessed to determine whether it is an appropriate size for the item 610. In its assessment, the inventory management system may identify that at least one item 616 within the set of items 612 is a compressible item (e.g., an item that may be compressed at least partially without breaking). Upon determining at least one item 616 within the set of items 612 is a compressible item, the inventory management system may calculate an amount that the at least one compressible item 616 may be compressed and/or an amount the at least one compressible item 616 has already been compressed. A usable size of the storage space 614 may then be calculated based on the actual space size as well as the amount that the at least one compressible item 616 may be compressed. The storage space 614 may be determined to be appropriate for the item 610 based on the usable size of the storage space 614.

Upon determining that a usable size of the storage space is adequate for the item 610, a robotic arm assembly may place the item 610 proximate to the storage space 614, increase a level of compliance associated with a manipulator holding the item 610, and insert the item 610 into the storage space 614 using the increased compliance. To do this, the item 610 may be pushed against other items in the set of items 612. For example, the item 610 may be pushed against other items in the direction of the at least one compressible item 616 in order to compress the at least one compressible item 616 and increase the size of the storage space 614. Once the item 610 has been inserted into the storage space 614, the compressible item 616 may be allowed to decompress.

In accordance with at least some embodiments, the inventory system may maintain a test area as a placement location. For example, the inventory system may maintain a placement location within which the walls and/or items have a known level of compliance and location. The inventory system may cause the robotic arm to grasp an item and place it into the test area in order to learn force limits for the item. In these embodiments, the inventory system may detect a length and/or size of an item to be tested. The inventory system may then cause the robotic arm assembly to position the item in the test area just before an object with a known position/level of compliance. Similar to the methods described above, the inventory system may identify a default force (which may be a force that is calculated not to result in breakage based on a compliance of the test area wall). The inventory system may subsequently push the item against the wall or other item using the calculated force. Using the test area in this fashion, the inventory system may be capable of assessing a force limit and/or bounding box for an item.

By way of illustration, the inventory system may maintain a test area that is four feet wide by four feet long and four feet high. In this illustration, the inventory system may detect (e.g., using machine vision) that an item to be tested extends two feet beyond the EOAT. In this illustrative example, the inventory system may cause the robotic arm to position the EOAT two or more feet from the back wall. Once positioned, the robotic arm may begin to push the item against the wall while maintaining the calculated amount of force. In some embodiments, the inventory system may monitor a change in position of the item to calculate a force limit for the item. In some embodiments, once the item is detected as having been stopped by the wall, the EOAT may be configured to rotate the item and push up against the wall a second time. This process (rotate and push against the wall) may be repeated to create a bounding box for the item.

Figure 7:
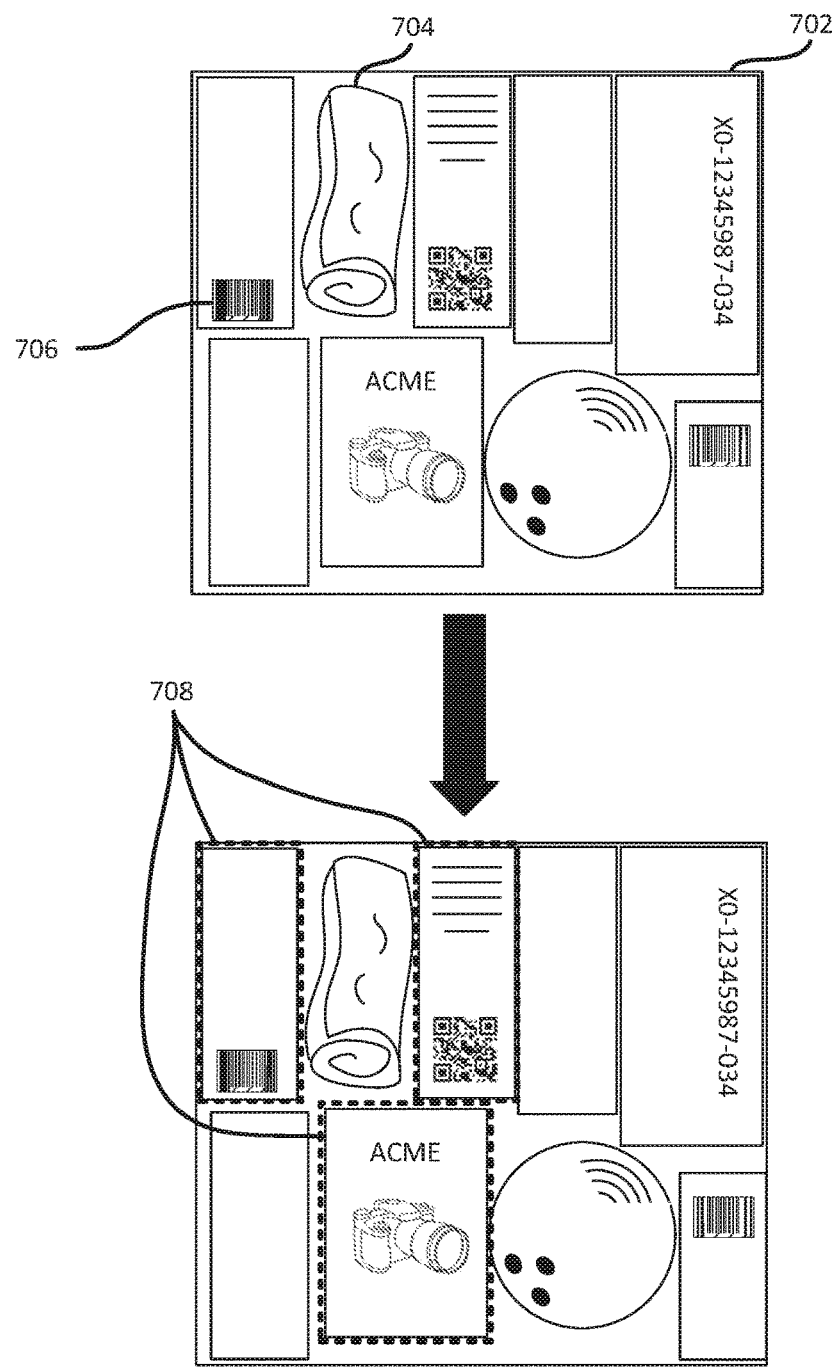
FIG. 7 depicts a technique for identifying and/or stowing items for easier retrieval in accordance with at least some embodiments.

FIG. 7 depicts a technique for identifying and/or stowing items for easier retrieval in accordance with at least some embodiments. In FIG. 7, an inventory holder 702 is depicted containing several items. In accordance with at least some embodiments, an inventory management system may be configured to retrieve an item 704 from the inventory holder 702. In some embodiments, the item 704 may be one that is hard to identify using image processing techniques. For example, an inventory management system may typically compare image information for the item to information stored in an item database to confirm the presence of the item. However, the item 704 may comprise a clothing item that is folded, or otherwise has an alterable form, making the item 704 difficult to identify via the sensor input. In this scenario, the inventory management system may identify items surrounding the hard-to-identify item 704.

Upon processing sensor information (e.g., images information) related to the inventory holder, the inventory management system may identify a number of items in the vicinity of the item 704 to be extracted. For example, in order to determine a location of a hard-to-identify item 704, the inventory management system may identify other items within the hard-to-identify item's vicinity which are easier to identify. In this example, the inventory management system may identify a number of items based on identifiers (e.g., text, images, machine readable codes, or any other suitable identifier) affixed to those items. Upon identifying items that the inventory management system knows to be in the vicinity of the hard-to-identify item 704, the inventory management system may generate bounding boxes around each of the items in the vicinity of the hard-to-identify item 704. In this way, the inventory management system may identify a likely location of the hard-to-identify item 704.

In accordance with at least some embodiments, techniques disclosed herein may comprise storing hard-to-identify items in the vicinity of (e.g., between) easier-to-identify items. These techniques enable the inventory management system to quickly identify and retrieve items stored in an inventory holder.

Figure 8:
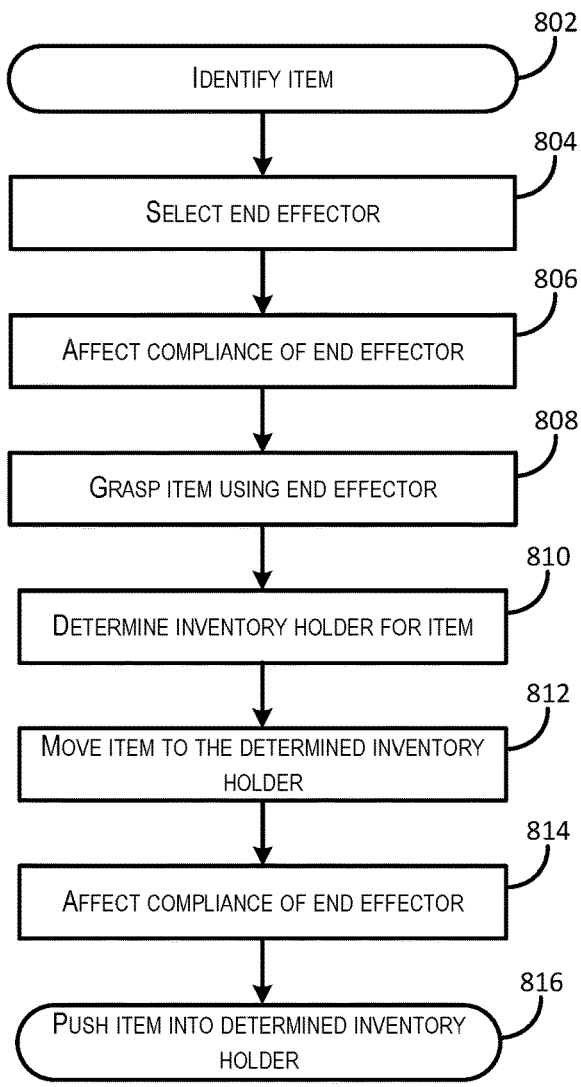
FIG. 8 depicts an illustrative flow diagram depicting a method of identifying and/or stowing items for easier retrieval in accordance with at least some embodiment.

FIG. 8 depicts an illustrative flow diagram depicting a method of identifying and/or stowing items for easier retrieval in accordance with at least some embodiments. Some or all of the process 800 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 800 of FIG. 8 may be performed by an inventory management system. The code may be stored on a computer-readable storage medium, for example, in the form of a computer program including a plurality of instructions executable by one or more processors. The computer-readable storage medium may be non-transitory.

The process 800 at 802 may include identifying an item. For example, the item may be identified based on sensor information (e.g., from the input sensor 114 described in FIG. 1) and/or based on information stored about the item (e.g., in an item database). This may include identifying a set of characteristics (which may include one or more characteristics) of the item that may be useful in planning and/or executing retrieval and/or storage of the item.

At 804, the inventory management system may select an appropriate end effector. In some embodiments, the inventory management system may determine a type of end effector appropriate for a particular item or type of item. In some embodiments, the end effector may be selected based on information assessed from sensor information (e.g., size of the item, texture of the item, shape of the item, etc.).

At 806, in some embodiments, the inventory management system may decrease the level of compliance in the robotic arm assembly. For example, one or more compliance variation mechanisms may be activated to increase or otherwise vary the mechanical impedance in the robotic arm assembly. This acts to "stiffen" or "loosen" the robotic arm assembly, enabling the robotic arm assembly to act with greater precision during the item grasping procedure. In some embodiments, the inventory system may not know the precise location of an item. To grasp the item, a level of compliance of the robotic arm assembly may be increased in order to increase the accuracy of the robotic arm. At the same time, a level of compliance in the end effector may be decreased in order to allow the end effector to better grasp the item (e.g., to wrap around the item).

The process 800 at 808 may include grasping the item. For example, the robotic arm may be instructed to grasp the item using any appropriate end effector from any appropriate orientation, or combination of end effectors and/or robotic arms. For example, the robotic arm may use information identified at 802 about an orientation of the item to facilitate grasping the item. In some embodiments, the inventory management system may determine that the item needs to be stored in a particular pose (e.g., orientation). In this example, the item may be grasped in such a way that it may be placed in a storage location in the determined pose.

At 810, the inventory management system may determine an inventory holder in which the item is to be stored. In some embodiments, the inventory management system may identify an appropriate inventory holder based on a size of an available storage location available within the inventory holder. In some embodiments, an appropriate inventory holder based on types of items stored within the inventory holder. The inventory management system may determine a storage location based on the ease with which certain items (e.g., the item being stored and/or the items in the inventory holder) may be identified.

At 812, the inventory management system may move the item to the determined inventory holder. In some embodiments, the robotic arm assembly may be mounted on a mobile drive unit. In these embodiments, the robotic arm assembly may be configured to traverse to the identified inventory holder. In some embodiments, a mobile drive unit may collect the inventory holder and bring it to the robotic arm assembly. Once the robotic arm assembly is near the appropriate inventory holder, the robotic arm assembly may move the item into position in front of the identified storage location.

At 814, the inventory management system may increase the level of compliance in the robotic arm assembly. For example, one or more compliance variation mechanisms may be activated to decrease or otherwise vary the mechanical impedance in the robotic arm assembly. This acts to "loosen" the robotic arm assembly, enabling the robotic arm assembly to stow items with greater flexibility during the item storage procedure. In some embodiments, the amount that the mechanical impedance of the robotic arm is decreased may depend upon the type of item to be stored or the types of items also within the inventory holder. For example, the inventory management system may determine a force limit associated with each of the items in the inventory holder and the item to be stored.

At 816, the inventory management system may push the item into the determined storage location. In some embodiments, the item may be pushed in one direction or another against other items until the storage location is expanded. In some embodiment, the robotic arm assembly may be configured to push against other items until the end effector has absorbed a maximum amount of force possible with the increased compliance. For example, the end effector may be used to push the item up against one or more other items until the end effector has bent to a maximum extent allowed by the increased compliance.

Figure 9:
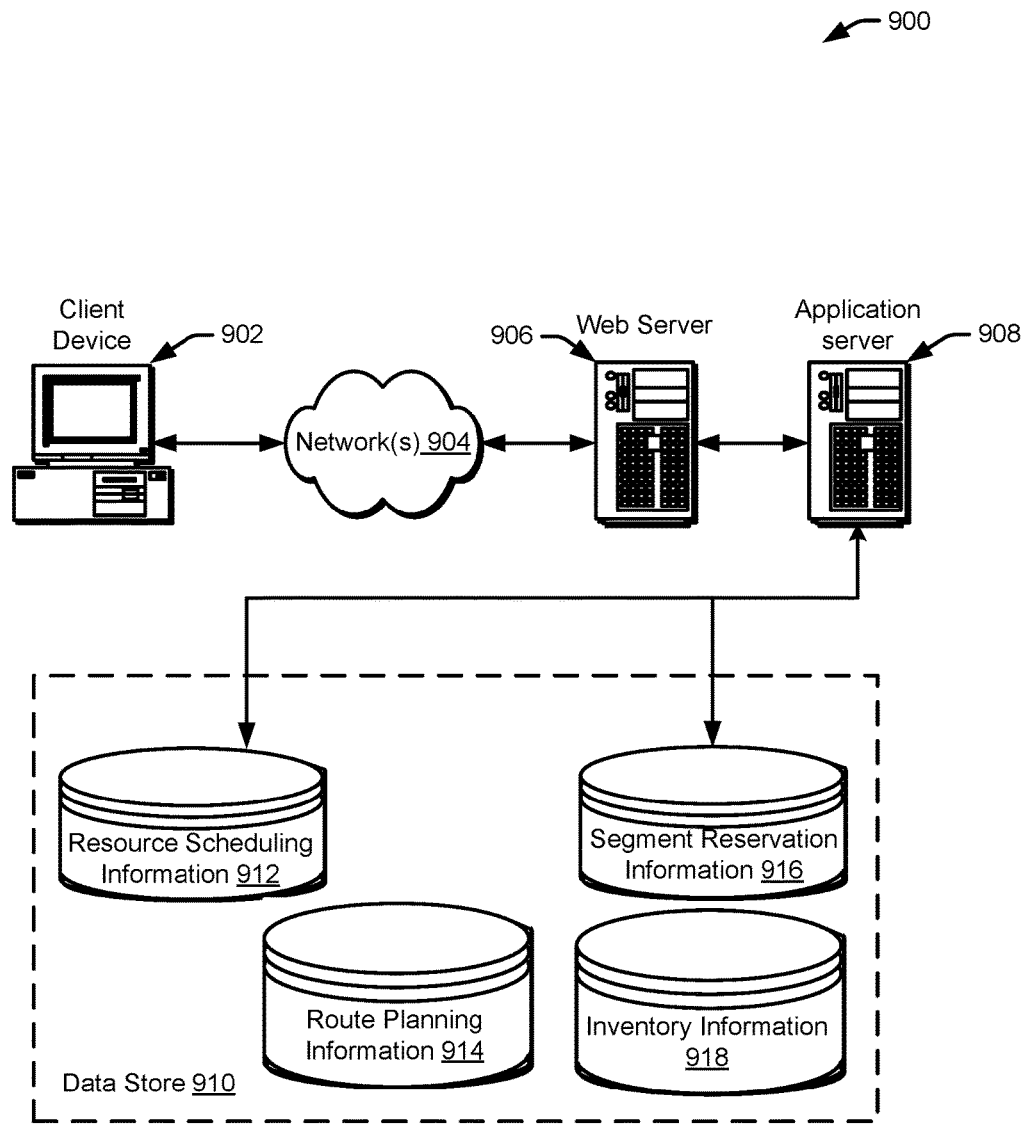
FIG. 9 illustrates an environment in which various features of the inventory system can be implemented, in accordance with at least one embodiment.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing information which can be used by modules described herein, such as resource scheduling information 912, route planning information 914, segment reservation information 916, and/or inventory information 918. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
   a robotic arm assembly comprising an end effector designed to interact with one or more inventory items;
   one or more compliance variation mechanisms;
   a processor; and
   a memory including instructions that, when executed with the processor, cause the robotic arm assembly to, at least:
      identify an item to be manipulated;
      determine a placement location in which the identified item is to be stowed;
      cause the robotic arm assembly to grasp the item using the end effector;
      cause the robotic arm assembly to move the item to the determined placement location;
      cause the one or more compliance variation mechanisms to vary a compliance level of the end effector based at least in part on a determination that the item is within a threshold distance of the placement location; and
      cause the robotic arm assembly to place the item in the determined placement location.

2. The inventory system of claim 1, wherein the placement location is determined based at least in part on a size or shape of the identified item.

3. The inventory system of claim 1, wherein prior to causing the robotic arm assembly to grasp the item using the end effector, the instructions further cause the robotic arm assembly to cause the one or more compliance variation mechanisms to vary the compliance level of the end effector.

4. The inventory system of claim 1, wherein the end effector comprises a portion of an end-of-arm tool (EOAT).

5. A computer-implemented method; comprising:
   identifying an item to be manipulated using an end effector;
   determining a placement location for the identified item based at least n part on an attribute of the item;
   grasping the item using the end effector;
   moving the item to the placement location;
   varying a compliance associated with the end effector based at least in part on a determination that the item is within a threshold distance of the placement location; and
   placing the item at the placement location.

6. The computer-implemented method of claim 5, further comprising selecting the end effector based at least in part on a type associated with the item.

7. The computer-implemented method of claim 5, wherein the placement location for the identified item is determined based at least in part on attributes of other items located proximate to the placement location.

8. The computer-implemented method of claim 5, wherein the variation to the compliance associated with the end effector is determined based on the item.

9. The computer-implemented method of claim 5, wherein the item is identified using one or more image processing techniques.

10. The computer-implemented method of claim 5, further comprising determining a pose appropriate for the item and the placement location.

11. The computer-implemented method of claim 10, wherein placing the item into the placement location comprises placing the item into the determined pose.

12. The computer-implemented method of claim 5, wherein placing the item at the placement location comprises pushing aside one or more items in a vicinity of the placement location.

13. The computer-implemented method of claim 5, further comprising altering the compliance associated with the end effector prior to grasping the item using the end effector.

14. An inventory management system comprising:
   at least one robotic arm assembly;
   a processor; and
   a memory including instructions that, when executed with the processor, cause the robotic arm assembly to, at least:
      remove an item from a first location;
      determine a second location to receive the item, the second location determined to optimize a gross cubic utilization;
      move the item into proximity of the second location;
      vary a level of compliance of the robotic arm assembly; and
      place the item into the second location.

15. The inventory management system of claim 14, wherein the second location is determined based at least in part on a size and/or shape of the item.

16. The inventory management system of claim 14, wherein the level of compliance of the robotic arm assembly is varied using a variable compliance actuator.

17. The inventory management system of claim 14, wherein the level of compliance of the robotic arm assembly is increased by loosening a connection between the item and an end effector.

18. The inventory management system of claim 14, wherein placing the item into the second location comprises pushing the item against one or more items in proximity to the second location.

19. The inventory management system of claim 14, wherein optimizing the gross cubic utilization comprises maximizing a number of items stored in an inventory space.

20. The inventory management system of claim 14, wherein the second location is determined based on a fragility of the item.

\* \* \* \* \*

UNITED STATES PATENT AND TRADEMARK OFFICE
CERTIFICATE OF CORRECTION

PATENT NO. : 10,207,868 B1
APPLICATION NO. : 15/371077
DATED : February 19, 2019
INVENTOR(S) : Andrew Stubbs et al.

Page 1 of 1

It is certified that error appears in the above-identified patent and that said Letters Patent is hereby corrected as shown below:

In the Claims

Column 19, Line 64, Claim 5:
Delete: "A computer-implemented method; comprising:"
Insert: --A computer-implemented method, comprising:--

Signed and Sealed this
Sixth Day of August, 2019

Andrei Iancu
*Director of the United States Patent and Trademark Office*